United States Patent
Lundqvist et al.

(10) Patent No.: US 8,381,008 B2
(45) Date of Patent: Feb. 19, 2013

(54) METHOD AND PROTECTION DEVICE FOR A POWER NETWORK ACCOUNTING FOR ROUTE SWITCHING IN A TELECOMMUNICATION NETWORK

(75) Inventors: Bertil Lundqvist, Vasteras (SE); Bjorn Lexelius, Vasteras (SE); Kent Wikstrom, Vasteras (SE)

(73) Assignee: ABB Technology AG (CH)

( * ) Notice: Subject to any disclaimer, the term of this patent is extended or adjusted under 35 U.S.C. 154(b) by 330 days.

(21) Appl. No.: 12/692,074

(22) Filed: Jan. 22, 2010

(65) Prior Publication Data

US 2010/0146319 A1 Jun. 10, 2010

Related U.S. Application Data

(63) Continuation of application No. PCT/EP2007/057564, filed on Jul. 23, 2007.

(51) Int. Cl.
 *G06F 1/12* (2006.01)
(52) U.S. Cl. ........................................ 713/400
(58) Field of Classification Search ............ 713/400
 See application file for complete search history.

(56) References Cited

U.S. PATENT DOCUMENTS

| | | | |
|---|---|---|---|
| 6,175,604 B1 * | 1/2001 | Noro et al. | 375/364 |
| 6,448,925 B1 * | 9/2002 | Shridhara | 342/357.59 |
| 2004/0221296 A1 * | 11/2004 | Ogielski et al. | 719/313 |

FOREIGN PATENT DOCUMENTS

| | | |
|---|---|---|
| EP | 1195876 A2 | 4/2002 |
| WO | 02061907 A1 | 8/2002 |

OTHER PUBLICATIONS

International Preliminary Report on Patentability; PCT/EP2007/057564; Sep. 24, 2009; 11 pages.
International Search Report and Written Opinion of the International Searching Authority; PCT/EP2007/057564; Mar. 28, 2008; 12 pages.

* cited by examiner

*Primary Examiner* — Kim Huynh
*Assistant Examiner* — Eric Chang
(74) *Attorney, Agent, or Firm* — St. Onge Steward Johnston & Reens LLC

(57) ABSTRACT

A protection device for a power network performs a method to align measuring times of first and second measurements of an electric quantity, taken at different ends of a power network line transmitted with measuring times via a telecommunication network. In the method, a send transmission time from the local to remote end of the line and a receive transmission time from the remote to local end of the line are determined based on time signals from internal clocks. After a global time reference to synchronize the internal clocks is lost, a clock drift is determined between the internal clocks. The measuring times of the first and the second measurements are aligned using the send and receive transmission times as well as the clock drift. A sudden change in the clock drift is determined in order to recognize a route switching in the telecommunication network and the clock drift is corrected.

7 Claims, 3 Drawing Sheets

METHOD AND PROTECTION DEVICE FOR A POWER NETWORK ACCOUNTING FOR ROUTE SWITCHING IN A TELECOMMUNICATION NETWORK

CROSS-REFERENCE TO RELATED APPLICATIONS

The present application is a continuation of pending International patent application PCT/EP2007/057564 filed on Jul. 23, 2007 which designates the United States and the content of which is incorporated herein by reference.

FIELD OF THE INVENTION

The invention relates to a method to align measuring times of a first and a second measurement of an electric quantity and to a protection device to protect a power network, where the protection device is able to execute the method.

In the power network, a first measurement is taken at a local end of a line of the network and is transmitted by a first protection device together with a corresponding first measuring time expressed by a first internal clock via a telecommunication network to a remote end of the line. A second measurement is taken at the remote end of the line and is transmitted by a second protection device together with a corresponding second measuring time expressed by a second internal clock via the telecommunication network to the local end of the line after the first measurement was received by the second protection device.

The method comprises the steps of determining a send transmission time from the local to the remote end of the line, determining a receive transmission time from the remote to the local end of the power line, aligning the measuring times of the first and the second measurements by expressing the measuring time of the second measurement in terms of the first internal clock using the send and receive transmission times.

BACKGROUND OF THE INVENTION

In today's power networks telecommunication is used to monitor and control the power generation and load flow in the network as well as to provide protection functions which take into account measurements from sensors distributed in the network. For protection purposes, in particular differential protection methods, measurements taken at the two ends of a transmission or a distribution line of a power network are compared with each other. In order to make a measurement taken at the local end truly comparable with a measurement taken at the remote end of the power line, the exact time of actual measuring at the remote end relative to the time of measuring at the local end has to be determined. This is especially important in cases where measurements of an alternating quantity, such as current or voltage of an AC transmission or distribution line, are to be compared with each other and where a fault is detected if the difference between two measurements exceeds a predetermined level. In these cases it is essential to eliminate the part of the difference which is determined only because the measurements are taken at different times, which gives a virtual phase angle difference.

The exact time of measurement at the remote end of the line is achieved by sending out the measurement from the local to the remote end together with a time stamp generated at the time the measurement was taken. The remote end replies with sending out a measurement taken at its own side together with the corresponding time stamp as well as with the timestamp received from the local end. Together with the measurements information is transmitted about the times when the messages were sent and received, respectively. This information is then used in the local end to determine the transmission time, i.e. the time period evolving between the sending and the receiving of a message. The method is known as echo-timing and it is for example described in WO02/061907A1, where it is called "Ping-Pong" technique. Knowing the transmission time, the local end can then recalculate the time when the measurement at the remote side was taken with respect to its own local internal clock. The measuring times of the measurements taken locally and remotely are thereby synchronized with each other so that further processing becomes possible.

The echo-timing method assumes that the transmission time between local and remote end is equal in each direction. This is usually true if the measurements are transmitted via a telecommunication network with fixed transmission routes, i.e. where the messages between two points in the telecommunication network always take the same way. However, modern telecommunication networks are composed of interconnected loops or rings, i.e. they represent a meshed system, and the route a message can take can be freely chosen along the branches of the meshed system. A control unit of such a telecommunication network tries to find the best route across the network based on the current network traffic and transmission quality. This results in unspecified routes and thereby unspecified transmission times between the local and the remote end of the power line. A change from one route to the other is called route switching.

In order to overcome the problem with unspecified transmission times, it is known in the art to add a GPS clock (Global Positioning System) to each end of the power line, as further described in WO02/061907A1. The GPS clocks receive an independent and global time signal from the corresponding satellite system thereby providing a common time frame in the power network. The GPS clocks are used to generate the time stamps for the measurements. The time stamps are thereby automatically synchronized so that further processing of the measurements after transmittal becomes possible without knowledge of the transmission time.

Since the availability of the GPS signal can not be 100%, a back-up solution is required for the periods when GPS is lost. In WO02/061907A1 a method is described, where during GPS reception the transmission times between the local and the remote end are calculated for both directions from the GPS time stamps and stored in a memory. If GPS is lost, the transmission times stored last together with time stamps from the internal clocks are used to align the measurements from local and remote end with each other. Since the method works reliably only as long as the transmission times remain unchanged, i.e. as long as no route switching occurs, it is further suggested to compare the stored transmission times with transmission times determined using the echo-timing method in order to detect a change in the message routing. If a route switching is detected, a fault signal is issued to alert observers that the protection of the power line is no longer reliable.

SUMMARY OF THE INVENTION

The above described method has the disadvantage that it works only reliably as long as no route switching occurs after the GPS signal is lost. This period of time can be comparatively short. Therefore it is an object of the present invention to provide a method and a protection device, in particular a differential protection device, for a power network which account for route switching even after the loss of the GPS signal.

The object is achieved by a method according to claim 1 and a protection device according to claim 7 which is able to carry out the method.

According to the invention, a so called transmission difference is determined as difference between the send and the receive transmission times and the transmission difference is stored. This is done as long as the first and the second internal clock are synchronized by a global time reference, i.e. as long as for example a GPS signal is available. After losing the global time reference, the send and receive transmission times can no longer be determined using the global time. While the transmission of the first and second measurements and their time stamps continues, it is also continued to determine the send and receive transmission times, but now time signals generated by the first and the second internal clock are used. Since the first and the second internal clock start drifting once they are no longer synchronized by a global time, a clock drift is determined between the first and the second internal clock from the stored transmission difference and from the continuously determined send and receive transmission times. The measuring times are now aligned by additionally taking into account the clock drift. In order to detect a route switching, a sudden change in the clock drift is determined and the stored transmission difference is corrected using values of the clock drift determined just before and just after the sudden change.

Thus, the invention is based on the recognition of the fact that a sudden change in the clock drift represents a route switching. This is the case since the clock drift, which is calculated from the difference between the instantaneous transmission difference and the stored, i.e. expected, transmission difference, is a slow and gradual process while a route switching leads to a sudden change in the send and/or receive transmission time and thereby in the transmission difference. Accordingly, the invention proposes to monitor the clock drift and to react on a sudden change in the clock drift by correcting the stored transmission difference according to the new send and receive transmission times measured after the sudden change, i.e. after the route switching.

As a result, the invention enables a protection device to work reliably for a long time after the global time reference is lost since the increasing clock drift between the first and the second internal clock as well as repeated route switchings are accounted for. Thereby, the measuring times of the first and the second measurement can be synchronized even without a common time frame and varying send and receive transmission times.

In a preferred embodiment, the clock drift is determined as half of the sum of the stored transmission difference and the instantaneous difference between receive transmission time and send transmission time.

In a further embodiment, a sudden change in the clock drift is determined by comparing an instantaneous value of the clock drift with a low-pass filtered value of earlier clock drifts. This enables the clear differentiation between the gradually changing clock drift and the fast change in the clock drift due to route switching since the difference between the instantaneous and the filtered value should always be close to zero while only clock drifting occurs. The low-pass filtering can for example be accomplished by calculating a moving average of earlier clock drifts.

According to a further embodiment of the invention, the stored transmission difference is corrected by subtracting from the stored transmission difference twice the difference between a value of the clock drift determined after and a value of the clock drift determined before the sudden change. In a special realisation of this embodiment, the value of the clock drift determined before the sudden change is equated with the low-pass filtered value of earlier clock drifts.

The first and second internal clocks are either synchronized by the global time reference or run freely if the global time reference is not available. In an embodiment of the invention, the send and receive transmission time are calculated in the following way. A first sending time is given by the first internal clock when the first measurement is sent out by the first protection device, a first receiving time is given by the second internal clock when the first measurement is received by the second protection device, a second sending time is given by the second internal clock when the second measurement is sent out by the second protection device, a second receiving time is given by the first internal clock when the second measurement is received by the first protection device, the send transmission time is determined as the difference between the first receiving and the first sending time and the receive transmission time is determined as the difference between the second receiving and the second sending time.

BRIEF DESCRIPTION OF THE DRAWINGS

The invention is now described by way of example with reference to the accompanying drawings in which.

DETAILED DESCRIPTION OF THE INVENTION

Figure 1:
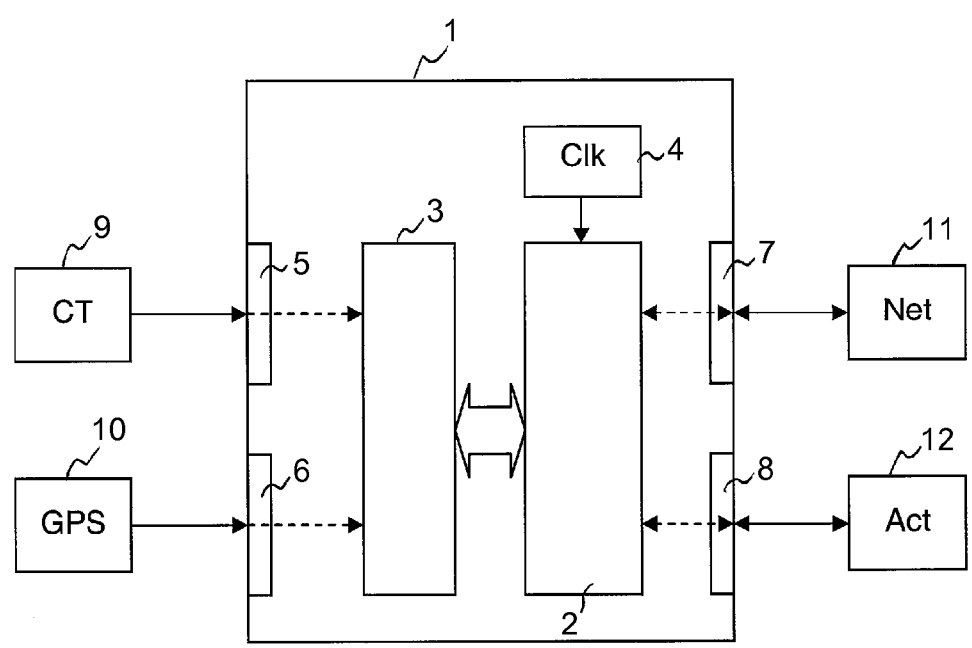
FIG. 1 shows a first protection device.

In FIG. 1 a first protection device 1 is shown which comprises a processing unit 2, a storage unit 3, a first internal clock 4, a measurement input interface 5, a clock input interface 6, a bidirectional communication interface 7 and a control output interface 8. The first protection device 1 can be installed at a local end of a line of a power transmission or distribution network in order to monitor the status of the line from current and/or voltage measurements taken at the line and in order to protect the power network in case of a fault on the line by initializing the disconnection of the line from the rest of the power network. In the example of FIG. 1, a current transformer 9 delivers current measurement signals taken at the local end of the line to the measurement input interface 5. The communication interface 7 is connected to a telecommunication network 11, so that the first protection device 1 is able to communicate with a second protection device arranged at the remote end of the line. The second protection device comprises the same elements as the first protection device shown in FIG. 1. The processing unit 2 derives first measurement data from the current measurement signals and generates a corresponding measurement time. The processing unit 2 generates the measurement time and other time information based on signals received from the first internal clock 4 as well as from a global time reference. In FIG. 1, the global time reference is the clock signal from a GPS receiver 10 which is input to the first protection device 1 via the clock input interface 6. The processing unit 2 uses the global time reference to synchronize the first internal clock 4 with the global GPS time. The first measurement data is sent out by the first protection device 1 together with the corresponding measurement time via the telecommunication network 11 to the second protection device. At the same time a first sending time ts1 is generated and transmitted which represents the sending time of the first measurement data. The first protection device 1 receives a second measurement data together with the corresponding measurement time and together with further time information from the second protection device. The further time information is used by the processing unit 2 together with the first sending time ts1 and together with a second receiving time tr2, which is generated when the second measurement data is received, to synchronize the measuring times of the first and the second measurement data so that the first and the second measurement data can be aligned and further processed in order to determine the fault status of the line. In case that a fault in line is detected, the processing unit generates a control signal and outputs it via the control output interface 8 to the driving unit 12 of an actuator. As a result of the control signal, the actuator, which is for example a breaker, is operated by the driving unit 12 so that the line is disconnected from the rest of the power network. This protection method is known as differential protection.

Figure 2:
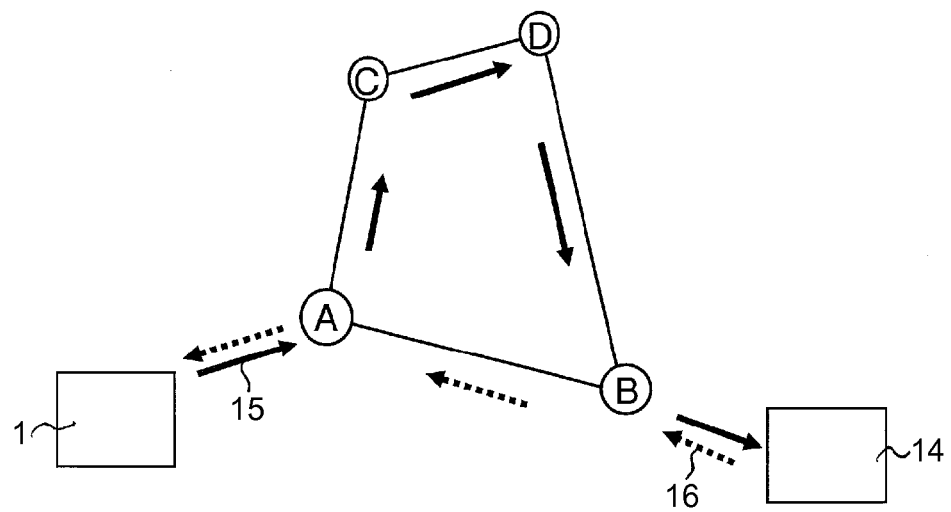
FIG. 2 shows a telecommunication network used by a first and a second protection device to transmit measurements between each other.

FIG. 2 shows a loop 13 of the telecommunication network 11 comprising four nodes A, B, C and D. The first protection device 1 is connected to node A and the second protection device 14 is connected to node B. Both protection devices 1 and 14 use the telecommunication network 11 to transmit measurements and time signals between each other. The routing of messages inside the telecommunication network 11 is unspecified and changeable. In the example shown in FIG. 2, a first message 15 comprising the first measurement, the corresponding measuring time and the first sending time ts1 is sent out by the first protection device 1 to the second protection device 14. The first message 15 (straight line) is routed along the nodes A, C, D and B. A second message 16 (dotted line), which is sent out by the second protection device 14 to the first protection device 1 and which comprises the second measurement, the corresponding measuring time and the further time information, is routed directly from node A to node B instead. As a result, the send transmission time from the perspective of the first protection device 1 is measurably longer than the receive transmission time.

Figure 3:
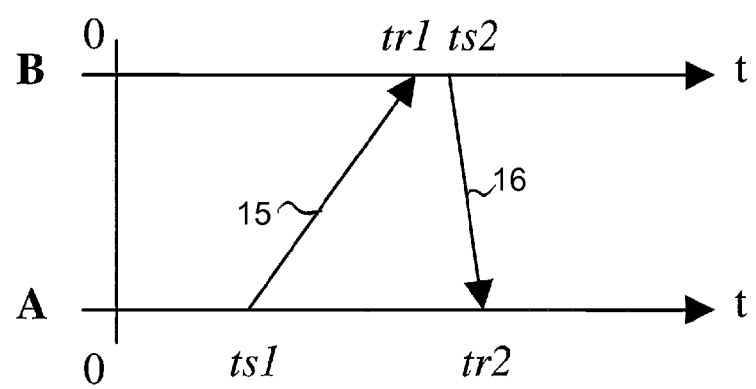
FIG. 3 shows the timing of a bidirectional transmission between the first and the second protection device before a route switching.

FIG. 3 illustrates this situation in a timing diagram. At the first sending time ts1, the first message 15 is sent out by the first protection device 1, i.e. it leaves node A. At a first receiving time tr1, the first message 15 is received at node B and thereby by the second protection device 14. At a second sending time ts2, the second message 16 is sent out by the second protection device 14. As said before, the second message 16 comprises the second measurement, the corresponding measuring time and the further time information, where the further time information is represented by the first receiving time tr1 and the second sending time ts2. The second message 16 takes a shorter time between nodes B and A, and arrives at the second receiving time tr2 at the first protection device 1. The first sending time ts1 and the second receiving time tr2 are measured by the first internal clock 4 in the first protection device 1, and the first receiving time tr1 and the second sending time ts2 are measured by the second internal clock in the second protection device 14.

After receiving the second message 16, the processing unit 2 in the first protection device determines the following quantities using the following equations.

A send transmission time TmS is determined as the difference between the first receiving time tr1 and the first sending time ts1:

$$TmS = tr1 - ts1 \qquad (1).$$

A receive transmission time TmR is determined as the difference between the second receiving time tr2 and the second sending time ts2:

$$TmR = tr2 - ts2 \qquad (2).$$

A transmission difference Asm is determined as the difference between the send transmission time TmS and the receive transmission time TmR:

$$Asm = TmS - TmR \qquad (3).$$

As long as the first and the second internal clocks are synchronized by the global GPS time reference, the transmission difference Asm represents precisely the asymmetry in the transmission times due to the different routing of messages from node A to B and vice versa. As soon as the GPS signal is lost, the internal clocks start to drift, which adds up to the transmission difference Asm determined just before losing the GPS signal. The transmission difference Asm is therefore continuously stored by the processing unit 2 in the storage unit 3 until the GPS signal is lost, and the transmission difference Asm determined just before losing the GPS is called precise transmission difference Asm_prec in the following.

After the GPS signal is lost, the processing unit 2 continues to determine the send and transmission times TmS and TmR according to equations (1) and (2), respectively. Additionally, a clock drift CD is determined as half of the sum of the precise transmission difference Asm_prec and of the instantaneous difference between receive transmission time (TmR) and send transmission time (TmS):

$$DC = 0.5(TmR - TmS + Asm\_prec).$$

The clock drift DC is then used by the processing unit 2 to align the measuring times of the first and the second measurement. This is illustrated with the following example.

It is assumed that GPS is still available and that the sending and receiving times are measured by the internal clocks with the following values:

$$ts1 = 1 \text{ ms},$$

$$tr1 = 6 \text{ ms},$$

$$ts2 = 7 \text{ ms and}$$

$$tr2 = 8 \text{ ms}.$$

The transmission quantities are determined as:

$$TmS = 6 \text{ ms} - 1 \text{ ms} = 5 \text{ ms},$$

$$TmR = 8 \text{ ms} - 7 \text{ ms} = 1 \text{ ms and}$$

$$Asm = 4 \text{ ms}.$$

Thus, the transmission of the first message 15 takes 4 ms longer than the transmission of the second message 16. When GPS is lost, the transmission difference of 4 ms is stored as precise transmission difference Asm_prec.

After a while, the following values are measured and calculated:

$ts1=1$ ms, $tr1=56$ ms, $ts2=57$ ms, $tr2=8$ ms, $TmS=56$ ms$-1$ ms$=55$ ms, $TmR=8$ ms$-57$ ms$=-49$ ms, $DC1=0.5(-49$ ms$-55$ ms$+4$ ms$)=-50$ ms.

Thus, the second internal clock is 50 ms ahead of the first internal clock. Accordingly, the processing unit 2 can now express the measuring time of the second measurement with respect of its own first internal clock by adding the instantaneously determined clock drift DC1 to the measuring time of the second measurement. The first and the second measurement thereby get the same time base, i.e. they are aligned with each other, so that further processing becomes possible.

Figure 4:
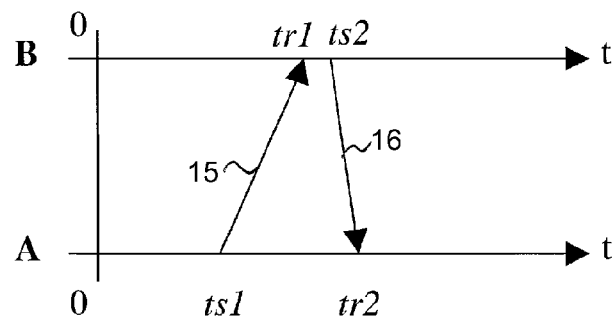
FIG. 4 shows the timing of a bidirectional transmission between the first and the second protection device after a route switching.

Then, suddenly, a route switching occurs which leads to the transmission times according to FIG. 4, i.e. the transmission time from node A to node B decreases while it remains the same from node B to node A. In other cases, the transmission times for both directions or only from node B to node A may change. Since the route switching occurs directly after the above clock drift DC1 was calculated, it can be assumed that the clock drift has still the same value of −50 ms. In the example of FIG. 4, the following time values are measured and calculated:

$ts1=1$ ms, $tr1=53$ ms, $ts2=54$ ms, $tr2=5$ ms, $TmS=53$ ms$-1$ ms$=52$ ms, $TmR=5$ ms$-54$ ms$=-49$ ms, $DC2=0.5(-49$ ms$-52$ ms$+4$ ms$)=-48.5$ ms.

Thus, after a route switching, the calculated clock drift suddenly changes even though in reality this is very unlikely.

Figure 5:
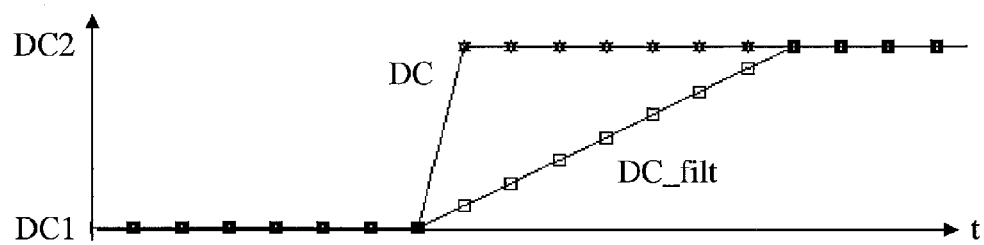
FIG. 5 shows the instantaneous clock drift and the low-pass filtered value of earlier clock drifts before and after the route switching.
Figure 6:
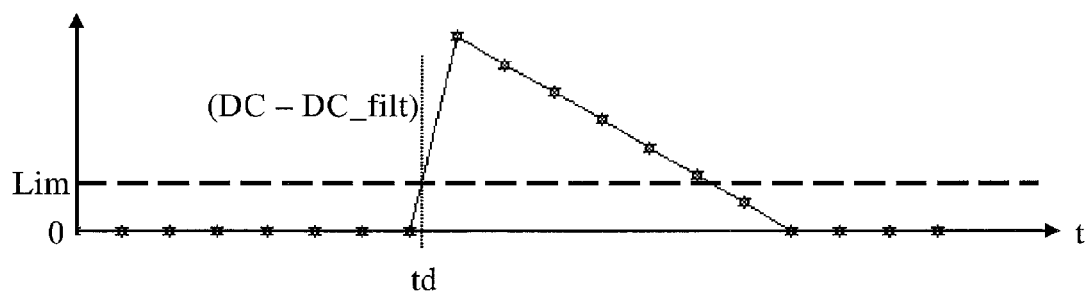
FIG. 6 shows the difference between the two values shown in FIG. 4.

Therefore, according to the present invention, the clock drift is monitored by the processing unit 2 and a sudden change is determined. This is for example achieved by comparing the instantaneous clock drift DC2 with a low-pass filtered value DC_filt of earlier clock drifts, as is shown in FIGS. 5 and 6. The instantaneous clock drift DC stays at the same value of around DC1=−50 ms for seven measurements (FIG. 5). Accordingly, the low-pass filtered value DC_filt reaches the same value, so that the difference between the instantaneous clock drift DC and the low-pass filtered clock drift DC_filt is of zero value (FIG. 6). After the eighth measurement, the instantaneous clock drift DC2=−48.5 ms is calculated. This can be seen as a jump in the instantaneous clock drift DC as well as in a jump in the difference (DC−DC_filt). Since the instantaneous clock drift stays at the new value of DC2=−48.5 ms, the low-pass filtered clock drift DC_filt slowly increases until it reaches the same level. If the difference between the instantaneous clock drift DC and the low-pass filtered clock drift DC_filt exceeds a predetermined limit Lim, a route switching is detected by the processing unit 2, which occurs in this example at detection time td.

Now, the processing unit 2 recognizes that the stored transmission difference Asm_prec is no longer correct, so that an incorrect instantaneous clock drift DC2 was calculated. The stored transmission difference Asm_prec is corrected by subtracting from the stored transmission difference Asm_prec twice the difference between the value DC2 of the clock drift determined after and a value of the clock drift determined before the sudden change. The value of the clock drift determined before the sudden change could be the instantaneous clock drift DC1 calculated just before losing the GPS signal, but advantageously it is set as the low-pass filtered value DC_filt in order to avoid to take into account any jitter in the telecommunication system or any other temporary variation:

$Asm\_prec=Asm\_prec-2(DC2-DC\_filt)$.

For the above example, the corrected transmission difference becomes:

$Asm\_prec=4$ ms$-2(-48.5$ ms$+50$ ms$)=1$ ms.

Now the correct instantaneous clock drift is calculated as $DC=0.5(-49$ ms$-52$ ms$+1$ ms$)=50$ ms.

With this corrected instantaneous clock drift, the alignment of the first and second measurement can be correctly processed even though a route switching had occurred. This method can be applied for several consecutive route switchings, thereby ensuring that the accuracy of the measurement alignment is preserved for a longer time after the global time reference is lost and thereby increasing the probability that the global time reference returns before the alignment becomes too inaccurate. Thus, the invention considerably increases the availability of the protection function provided by the protection device 1.

What is claimed is:

1. A method to align measuring times of a first and a second measurement of an electric quantity, where the first measurement
   is taken at a local end of a line of a power network and
   is transmitted by a first protection device together with a corresponding first measuring time expressed by a first internal clock via a telecommunication network to a remote end of the line and where the second measurement
   is taken at the remote end of the line and
   is transmitted by a second protection device together with a corresponding second measuring time expressed by a second internal clock via the telecommunication network to the local end of the line after the first measurement was received by the second protection device,
   the method comprising the steps of
   determining a send transmission time from the local to the remote end of the line,
   determining a receive transmission time from the remote to the local end of the line,
   aligning the measuring times of the first and the second measurements by expressing the measuring time of the second measurement in terms of the first internal clock using the send and receive transmission times, characterized in that
   as long as the first and the second internal clock are synchronized by a global time reference a transmission difference is determined as difference between the send and the receive transmission times and the transmission difference is stored, after losing the global time reference,
time signals generated by the first and the second internal clock are used to determine the send and receive transmission times,
a clock drift is determined between the first and the second internal clock from the transmission difference stored just before losing the global time reference and from the send and receive transmission times,
the measuring times are aligned by additionally taking into account the clock drift,
a sudden change in the clock drift is determined and the stored transmission difference is corrected using values of the clock drift determined just before and just after the sudden change.

2. The method according to claim 1, where the clock drift is determined as half of the sum
of the stored transmission difference and
of the instantaneous difference between receive transmission time and send transmission time.

3. The method according to claim 1, where a sudden change in the clock drift is determined by comparing an instantaneous value of the clock drift with a low-pass filtered value of earlier clock drifts.

4. The method according to claim 1, where the stored transmission difference is corrected by subtracting from the stored transmission difference twice the difference between the value of the clock drift determined after and the value of the clock drift determined before the sudden change.

5. The method according to claim 4, where the value of the clock drift determined before the sudden change is equated with the filtered value of earlier clock drifts.

6. The method according to claim 1, where
a first sending time is given by the first internal clock when the first measurement is sent out by the first protection device,
a first receiving time is given by the second internal clock when the first measurement is received by the second protection device,
a second sending time is given by the second internal clock when the second measurement is sent out by the second protection device,
a second receiving time is given by the first internal clock when the second measurement is received by the first protection device,
the send transmission time is determined as the difference between the first receiving and the first sending time and
the receive transmission time is determined as the difference between the second receiving and the second sending time.

7. Protection device to protect a power network comprising
a measurement input interface to receive a first measurement of an electric quantity taken at a local end of a line of the power network,
a first internal clock,
a clock input interface to receive a signal from a global time reference to synchronize the first internal clock with,
a storage unit,
a control output interface to output a control signal to a protection actuator,
a bidirectional communication interface to a telecommunication network
to transmit the first measurement together with a corresponding first measuring time expressed by the first internal clock and
to receive a second measurement taken at a remote end of the line and transmitted after reception of the first measurement by a second protection device together with a corresponding second measuring time expressed by a second internal clock,
a processing unit which
determines a send transmission time from the local to the remote end of the line,
determines a receive transmission time from the remote to the local end of the power line,
aligns the measuring times of the first and the second measurements by expressing the measuring time of the second measurement in terms of the first internal clock using the send and receive transmission times and
characterized in that the processing unit
as long as the global time reference is available, determines a transmission difference as difference between the send and the receive transmission times and stores the transmission difference in the storage unit,
after the global time reference is lost,
uses time signals generated by the first internal clock and received from the second internal clock to determine the send and receive transmission times,
determines a clock drift between the first and the second internal clock from the transmission difference stored just before losing the global time reference and from the send and receive transmission times,
aligns the measuring times by additionally taking into account the clock drift,
determines a sudden change in the clock drift and corrects the stored transmission difference using values of the clock drift determined just before and just after the sudden change.

* * * * *